United States Patent Office.

LOUIS HENRY GUSTAVUS EHRHARDT, OF LONDON, ENGLAND, ASSIGNOR TO GEORGE B. UPTON, DAVID D. STACKPOLE, AND SAMUEL H. GOOKIN.

Letters Patent No. 73,786, dated January 28, 1868.

IMPROVEMENT IN GUNPOWDER.

The Schedule referred to in these Letters Patent and making part of the same.

TO ALL WHOM IT MAY CONCERN:

Be it known that I, LOUIS HENRY GUSTAVUS EHRHARDT, of London, England, have invented an Improved Gunpowder; and do hereby declare the following to be a full and correct description of the same.

In the specification of Letters Patent, No. 55,795, granted to me, June 19, 1866, I described a gunpowder made by the combination of four ingredients, viz, nitrate of potash and chlorate of potash mixed with mineral carbon and cutch, or some equivalent vegetable substance.

The gunpowder which I now desire to secure by Letters Patent is an improvement on that described in the specification of the patent referred to. It consists of only three of the ingredients there named, viz, the nitrate of potash and the chlorate of potash mixed in proper proportions with mineral carbon. Powder thus compounded differs materially from that before named, in being less liable to accidental explosion, inasmuch as it does not explode when ignited in the open air, but burns slowly, something like common gunpowder when wet. But when confined, as in a gun, or in a blasting-hole in a rock, it explodes with even greater force than ordinary gunpowder. It is not much affected by dampness, generates but little smoke in burning, and is cheaper than the powder described in the patent above referred to.

To make this powder, the several ingredients must be finely pulverized and then intimately mixed together. The more finely they are pulverized the better. They require no other preparation. When the ingredients are well mixed the powder is ready for use. The proportions of the ingredients may be varied for different kinds of work. For use in coal mines, I prefer to take one part by bulk of chlorate of potash, four parts of nitrate of potash, and five parts of mineral coal. For blasting granite or other hard rocks, I prefer to take one part of chlorate of potash, two parts of nitrate of potash, and three parts of mineral carbon.

The mineral carbon may be either bituminous coal or anthracite; but I prefer to use the anthracite known as "red-ash." Wood charcoal may be used instead of mineral coal, but it is not so good. Nitrate of soda may also be used in place of the nitrate of potash.

As this powder does not explode when ignited in the open air, it may be prepared and kept for use or transported to other places, instead of being mixed at the time and place of use, like the powder described in the patent of June 19, 1866.

What I claim, and desire to secure by Letters Patent, is—

The powder herein described, consisting of the ingredients named, prepared and mixed as described.

The above specification of my said invention, signed and witnessed at Boston, this 27th day of Augus A. D. 1867.

L. H. G. EHRHARDT.

Witnesses:
  WILLIAM C. CLEVELAND,
  CHAS. F. STANSBURY.